United States Patent [19]
Banfi

[11] 3,976,893
[45] Aug. 24, 1976

[54] CIRCUIT FOR TESTING A LOGIC DELAY TIMER

[75] Inventor: Antonio Banfi, Milan, Italy

[73] Assignee: Societa Italiana Elettronica S.p.A., Milan, Italy

[22] Filed: Dec. 26, 1974

[21] Appl. No.: 536,489

[30] Foreign Application Priority Data
Feb. 20, 1974 Italy ................................ 48495/74

[52] U.S. Cl. ............................. 307/208; 307/293; 324/73 R; 235/151.3
[51] Int. Cl.² ................. H03K 19/08; G01R 15/12
[58] Field of Search ........... 307/208, 293; 324/73 R, 324/73 AT; 235/151.3, 151.31

[56] References Cited
UNITED STATES PATENTS

| | | | |
|---|---|---|---|
| 3,614,608 | 10/1971 | Giedd et al. | 324/73 R |
| 3,833,853 | 9/1974 | Milford | 324/73 R |
| 3,870,953 | 3/1975 | Boatman et al. | 324/73 R |
| 3,878,405 | 4/1975 | Sylvan | 307/215 |

*Primary Examiner*—Stanley D. Miller, Jr.
*Attorney, Agent, or Firm*—Ostrolenk, Faber, Gerb & Soffen

[57] ABSTRACT

A circuit for the in-service testing of a logic timer generating an internally-preset time-delayed output logic state in response to a timer control input logic state, including a first logic operator having an output equal to the logic product of the negation of the timer control logic input and an enable signal derived from the negation of the timer logic output; a second logic operator having an output which is the timer control logic input and is equal to the logic sum of a master input logic signal plus the output of the first logic operator; and a delay generator having an input which is the timer output logic signal and having an output which delays the return transition of the first logic operator output for a fixed duration of time less than the effective time required for actuation of the timer output load, whereby a master input logic state of duration greater than the time internal delay period produces a timer output logic state which begins at the end of the internal time-delay period and which ends with the cessation of the master input logic signal and a master input logic signal of duration less than the timer internal delay period produces a timer output logic state which begins at the end of the internal time-delay period and has a duration equal to the time-delay period of the delay generator, whereby the timer output load is not effectively activated.

10 Claims, 4 Drawing Figures

CIRCUIT FOR TESTING A LOGIC DELAY TIMER

BACKGROUND OF THE INVENTION

This invention relates to circuitry for testing the integrity of logic systems in general and more particularly relates to circuitry for testing logic delay timers during normal operation of an automation system in which the timer remains installed in its normal operating environment, without effectuating spurious outputs of the timer due to the testing sequence.

Logic systems normally used in automation technology frequently include timing circuits whose outputs are adapted to be activated a fixed length of time after the energizing of the timer input. Equipment which uses a delay timer for a critical activation or protection function will obviously be adversely affected if the timer fails to operate in the desired manner. A timer of this type normally requires that the master input signal exist for a time period of longer duration than the internal delay time. The timer output signal then appears at the end of the internal delay time and is present until the cessation of the master input signal. Improper operation of such a delay timer may result in either an output appearing with a delay shorter than the predetermined internal delay, including the case of no delay at all, or the output appearing with a delay longer than the predetermined internal delay, including the case of an output never appearing. The first mentioned type of timer delay failure is considered to be safe because, while causing untimely stoppage of the controlled installation, such failures do not jeopardize the safety of the installation through lack of activation or protection. The latter mentioned type of timer delay failure is considered to be unsafe because the controlled installation will not be protected in time, if at all. The first type of failure is self-revealing. The second type of failure can be revealed only through the use of special checking operations.

Procedures to test a logic system usually require that the system be temporarily removed from useful service while a test sequence which stimulates the delay timer and checks the timely appearance of the delayed output signal is completed. As the interval between such test sequences decreases, the confidence factor for isolating a delay timer failure increases but the percentage of usable equipment time decreases.

BRIEF SUMMARY OF THE INVENTION

It is desirable to test the operation of a delay timer without producing unwanted spurious logic interventions while the timer circuit remains connected in the equipment logic system and capable of responding to normal actuation and control signals.

To accomplish these functions, the test circuitry in accordance with the invention comprises: a first logic operator having an output equal to the logic product of the negation of the timer control logic input and an enable signal derived from the negation of the timer logic output; a second logic operator having an output which is the timer control logic input and is equal to the logic sum of a master input logic signal plus the output of the first logic operator; and a delay generator having an input which is the timer logic output signal and having an output which delays the return transition of the first logic operator output for a fixed length of time less than the effective time required for the actuation of the timer output load, whereby a master input logic state of duration greater than the timer internal delay period produces a timer output logic state which begins at the end of the internal time-delay period and which ends with the cessation of the master input logic signal and a master input logic signal of duration less than the internal time-delay period produces a timer output logic signal which begins at the end of the internal time-delay period and has a duration equal to the time delay period of the delay generator, whereby the timer output load is not effectively actuated.

The circuit for testing a logic delay timer just described has the advantages of permitting the testing of at least one delay timer installed in cascade connection in an equipment logic system while that system is in use, while allowing effective control intervention and actuation of the timer output load to be made at any necessary time including the time during which testing is being carried out.

Accordingly, it is the primary object of the invention to permit testing of a logic delay timer which is installed and in-service in an equipment logic system.

It is another object of the invention to permit such testing without causing the actuation of the timer output load.

It is a further object to permit such testing while allowing effective control intervention and actuation of the timer output load to be made at any time, including the time during which the test is being made.

It is a still further object to permit such testing of any number of logic delay timers in cascade connection.

It is a still further object to permit such testing without allowing system noise to cause the initiation of a test sequence.

It is a still further object of the invention to provide circuitry means which enables such testing.

These and other objects of the invention will become apparent from the following description of the accompanying drawings.

DETAILED DESCRIPTION OF THE INVENTION

Figure 1:
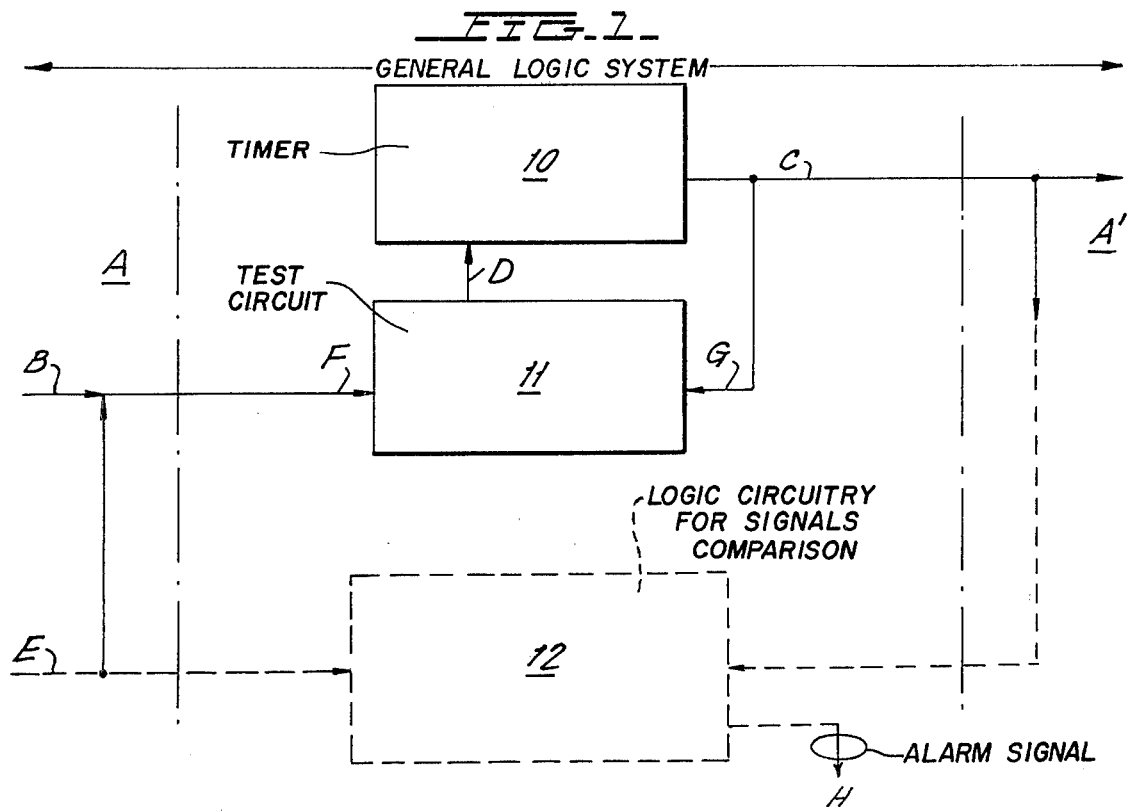
FIG. 1 is a functional block representation of the circuit in accordance with the invention and the logic delay timer and interconnections therebetween with which it is used.

Referring to FIG. 1 of the drawings, delayed output timer 10 forms an intermediate segment of a general logic system. A prior portion A of this logic system formulates a logic command signal B to activate the delay timer 10. The output response C of the timer 10 is connected to a later portion A' of the logic system to effectuate the desired system response.

The delay timer 10 receives a logic type control signal, characterized by a first inoperative state and by a second operative state. The timer output signal is also of this logic type. In a practical circuit the conventions used for inputs, outputs and other logic signals may also be different. Normally the timer input is in its first state and the timer output is in its first state, corresponding to the absence of a command B and of a response C, respectively. Upon arrival of a command B from the prior system portion A, the timer input D changes to its second state and the counting of the delay period commences. During the delay counting the ouput response C remains in its first state. If the input command B disappears before the timer count is completed, the delay timer 10 returns to the initial conditions. If the command input B has a time duration greater than the predetermined delay time, then the output C will change to its second state after the predetermined time period has elapsed. The output C will remain in its second state as long as the command input B persists. When the command input returns to its first state the timer output returns to the initial condition, that is, the first state. The timer output C must be in its second state for at least the period of time required by the latter portion A' of the logic system to react thereto or the system output will not be affected. If the latter portion of the logic system acts upon relays, for example, a timer output response which does not persist beyond the minimum intervention time of the relay, in the order of milliseconds, cannot give rise to an effective actuation of that relay and may be considered effectively non-existent. It is therefore possible to use a test pulse E having a duration shorter than the minimum load intervention time, $T_r$, to check the integrity of the various parts of the system without risking spurious interventions.

The test circuit 11 receives inputs from the prior portion A of the logic system. This input may be either a normal command B or a test pulse E having a duration shorter than the delay time period of the timer 10. The two signal input lines are connected as a "wired-OR" logic function, whereby either or both of the signals B and E may appear at the input F of the testing circuit 11. The test circuit generates a timer logic command D in response to the test circuit input F. The timer 10 generates a response C after a fixed delay time, $T_t$, and this response re-enters the test circuit 11 at a second input G. The re-entrant signal causes the removal of timer command D after a period of time having a duration less than the effective load response time if the command input to the test circuit 11 had returned to its first state and continues the presence of the timer command signal D if the input command B is present in its second state. The integrity of the delay timer 10, and of the test circuit 11 closely associated therewith, is confirmed by known logic means 12 which compares the test input command E and the output response C during a test cycle and signals an alarm H if the required response is not present for the test inut.

Any number of cascade connected timer-test circuit blocks, each having their output C in electrical connection to the master input F of the next block, can be tested if the output C of each has a time duration equal to the test pulse E duration, less than the effective response time, $T_r$, of the ultimate output load, A', and less than the delay time period of each timer.

Referring now to all the drawings, a preferred embodiment contains a delay timer 10 and a delay timer test circuit 11 which utilizes both positive and negative logic (operative state corresponding to the high or low voltage respectively) to carry out the sum, product and negation functions as shown by the commonly used logic symbols. However, for a better understanding, in the following circuit description the low voltage level state is always indicated as "logic zero" and the high voltage level state is always indicated as "logic one", regardless of the operative or inoperative action of the signal.

Figure 2:
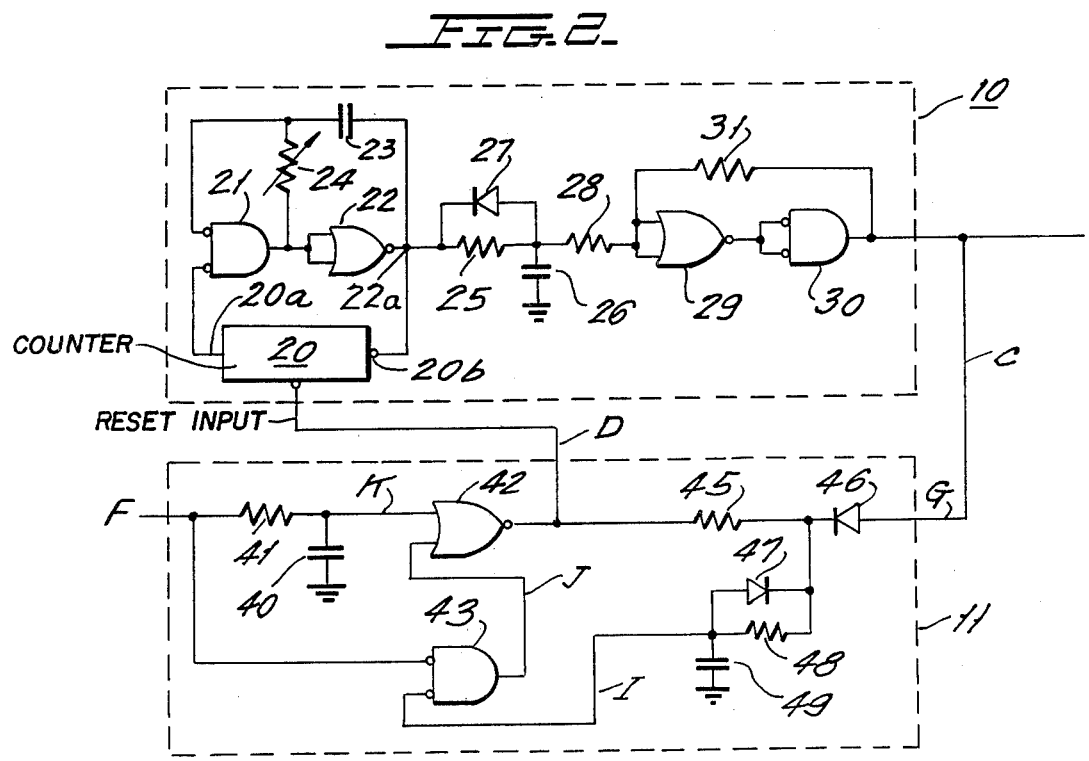
FIG. 2 is a schematic representation of circuitry designed in accordance with the principles of the present invention and of the logic delay timer and interconnections therebetween with which it is used.

The presence of a logic 1 on the timer input line D resets the multi-stage binary counter 20 (FIG. 2) and maintains the counter output 20a at a logic zero. Gates 21 and 22 form a stable multivibrator oscillating at a frequency determined by the charging capacitor 23 and the frequency adjustment rheostat 24. An asymmetric delay generator is formed by a series resistance 25, a shunt delay capacitance 26 and a diode 27. A threshold circuit is formed by input resistance 28, two series connected gates 29 and 30 and feedback resistance 31.

As long as the timer command input D remains in a logic 1 state the counter 20 remains reset and does not count the number of multivibrator pulses. The counter output 20a remains at logic zero and allows the multivibrating action of the gates 21 and 22, the capacitor 23 and the rheostat 24 to continue. The multivibrator output produces a train of logic pulses which are introduced into the delay generator input. When the pulse train is a logic 1, current flows through the charging resistor 25 into the delay capacitor 26 and the voltage at the junction therebetween rises with a exponential time constant proportional to the resistance 25 and the capacitance 26. The frequency of the multivibrator is adjusted with rheostat 24 whereby the output thereof returns to a logic zero before the delay generator output voltage can rise to a value high enough to change the state of the threshold circuit. When the multivibrator output is at a logic zero, the diode 27 is forward-biased by the stored charge in the capacitor 26 and provides a low resistance path for that stored charge to be drained to the essentially-zero voltage level at the multivibrator output. In this manner the input to the threshold circuit would never receive a delay generator output voltage sufficient to exceed the threshold and the output C remains at a logic zero.

As soon as the timer input command D falls to logic zero, the counter 20 begins to count the multivibrator pulses present at the input 20b thereof and the multivibrator produces a number of pulses thereafter until the counting time, $T_t$, the counter 20 is complete and the counter output 20a rises to a logic 1 and stops the multivibrator. The counting time, $T_t$, of the timer is proportional to the period of the multivibrator and to the number of pulses necessary to cause a logic 1 at the counter output 20a. When the counter stops, the multivibrator output 22a remains at a logic 1 and the delay capacitor 26 is charged through charging resistance 25. A delay generator output voltage will be reached at which the output of the threshold circuit and the timer both change to a logic 1. When the timer input D returns to a logic 1, the counter 20 is reset, the multivibrator begins oscillating and the delay capacitor 26 discharges through the diode 27 and removes the threshold firing voltage and the output signal C.

In a preferred embodiment, the test circuit 11 receives an input command F which may be either the test signal E or the effective input signal B. The input signal F passes through an input delay circuit formed by the delay capacitance 40 and charging resistance 41, and having a delay time $T_1$, before being applied to one input of two-input NOR gate 42. The logic product of the negation of the input F and an enabling signal I is generated by a NAND gate 43, whose output develops a hold signal J which is connected to the second input of the NOR gate 42. The delayed input signal K or the holding signal J at gate 42 produce the timer command D. The delay time, $T_1$, of the input delay generator is chosen to be quite shorter than the test pulse E and to exceed the general time duration of system noise pulses, thereby preventing the noise generation of false timer commands. The enable signal is the product of the timer command D and the negation of the timer output C and is developed by resistor 45 and diode 46. The enable signal is delayed by rising transitions only by a logic delay generator composed of diode 47, charging resistor 48 and delay capacitor 49.

Figure 3:
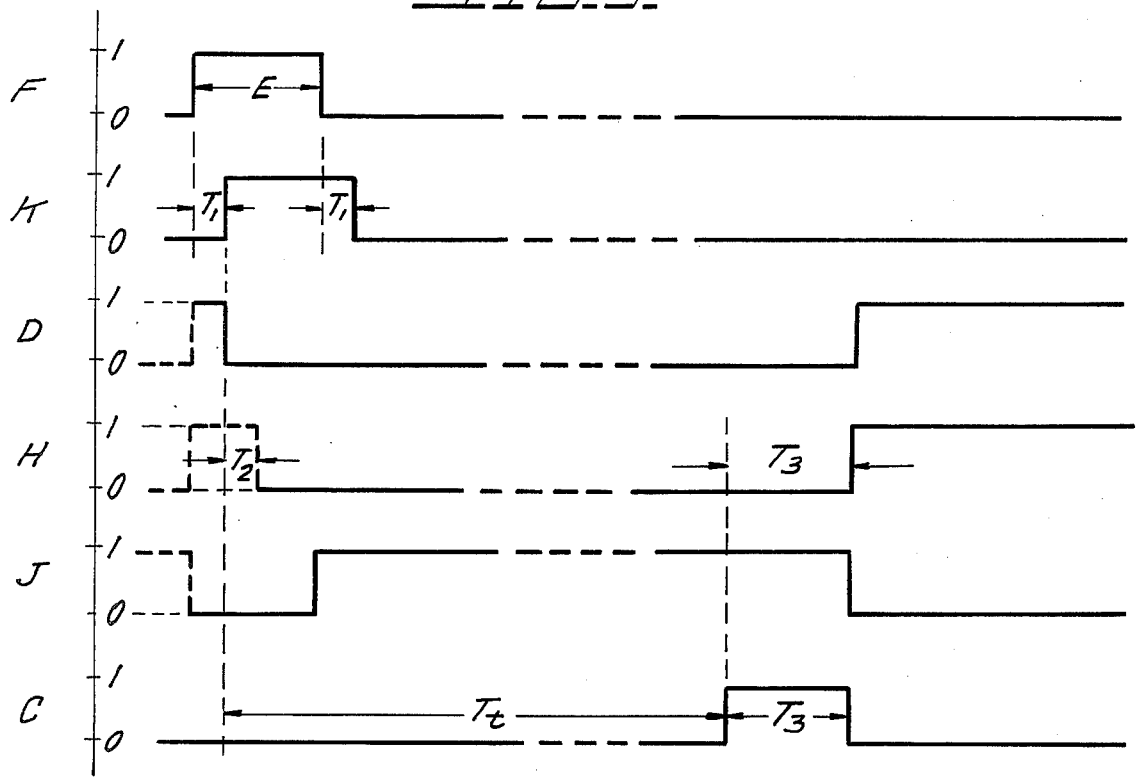
FIG. 3 is a timing diagram representing the sequence of logic signals within the circuitry in accordance with the invention for a test pulse input.

Referring now especially to FIG. 3, a test pulse E, of a time duration less than the effective response time $T_r$ of the latter portion A' of the system, enters the input F of the test circuit 11. Input F directly applies a logic 1 to gate 43 and the hold signal J is forced to a logic zero, irregardless of the state of the enable signal H at the other input of the gate 43. The input F is delayed by the input delay circuit comprised of resistor 41 and capacitor 40 and appears after time $T_1$ as a delayed input signal K applied to gate 42. The other input to gate 42 is the logic zero hold signal J. The output D of the gate 42 changes to a logic zero (since input K is at logic 1) and causes the reset of the counter 20 to be released and counting to be commenced. The output C of the timer 10 remains at a logic zero, by the sequence described above. While the timer command signal D is at logic 1, a delay capacitor 49 is charged through charging resistor 48 and the logic resistor 45. When the timer command input D falls to a logic zero, to initiate the timer count process, the capacitor 49 is discharged through the now forward-conducting diode 47 and the discharge resistor 45 and after a period of time, $T_2$, proportional to the values of resistor 45 and capacitance 49, the enable signal I also changes to logic zero. At some time thereafter, the test pulse E is removed and the test circuit input F changes to logic zero. The hold signal J, which is the product of the negated input F and the negated enable signal H, rises to a logic 1. The input delay circuit of capacitance 40 and the resistance 41 again delays the change of the input signal F, whereby a logic 1 remains at input K to the gate 42 and forces the timer command signal D to remain at a logic zero until the hold signal J rises to a logic 1. The NOR gate 42 requires that at least one of the two inputs, J or K, be a logic 1 in order to hold the timer command line D at a low level (logic zero) for an indefinite period of time. The count of the counter 20 is complete after time interval $T_t$ which time interval begins when input D changes to logic zero. When this counting time period has been completed, the output C of the timer circuit 10 changes to a logic 1. The logic 1 at the output C combined with the logic zero of the timer command signal D causes the forward conduction of diode 46 and the charging of the capacitor 49 through the charging resistance 48. After another period of time $T_3$, proportional to the values of the charging capacitor 49 and charging resistor 48, the enable signal I reaches the logic 1 level and causes the hold signal J to change to a logic zero which appears at the input of the gate 42 and causes the timer command input D to rise to a logic 1 and reset the counter 20. Resetting the counter 20 causes the output C of the timer circuit 10 to fall to a logic zero, as discussed above, and both circuits 10 and 11 return to their initial states. A logic 1 pulse of duration equal to $T_3$, which timer interval is chosen to be shorter than the effective response time of logic system A', is thus developed a period of time $T_t$ after a test pulse E has been introduced into the test circuit 11. The width of the test pulse E must be less than the sum of the input delay, $T_1$, and the counting period, $T_t$. The time duration of pulse $T_3$ must be adjusted to an interval less than $T_r$, the system effective response time.

Figure 4:
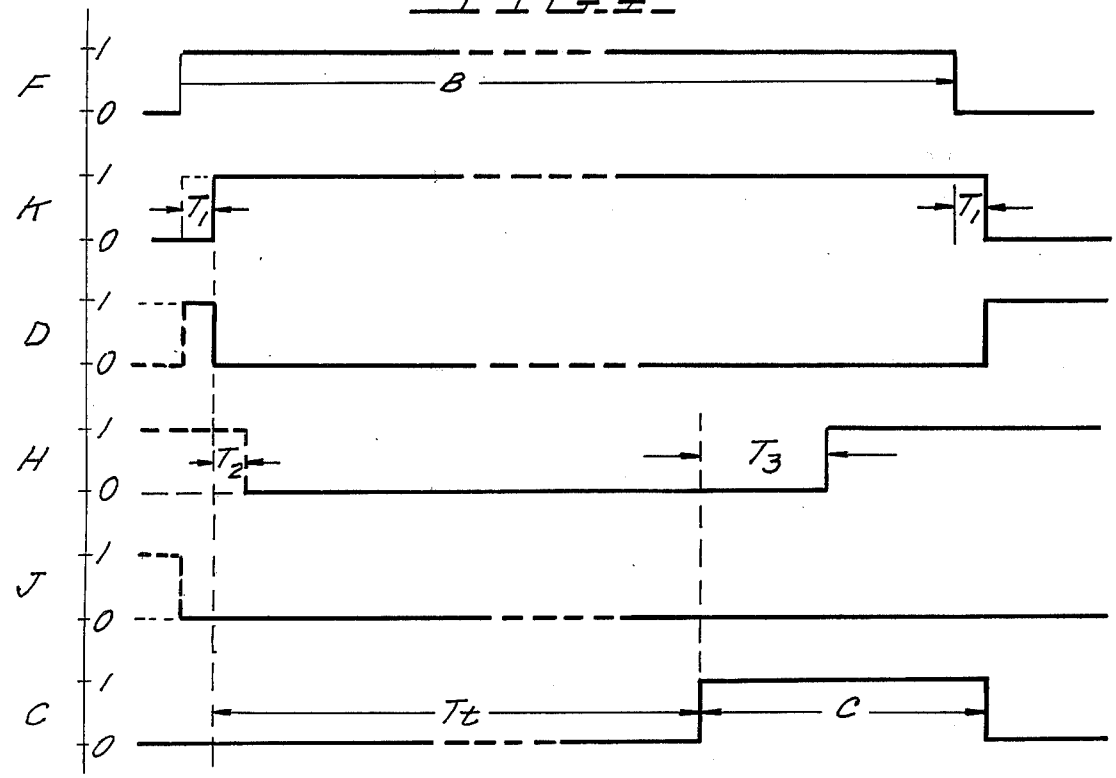
FIG. 4 is a timing diagram representing the sequence of logic signals within the circuit in accordance with the invention for an effective control logic input.

Referring now especially to FIG. 4, when an effective actuation applied at input B, having a duration greater than the sum of the input delay, $T_1$, the counting period $T_t$, and the test output time $T_3$, is applied to the input F of the test circuit 11, if the timer is counting because of a previous test pulse, a reset pulse is generated at the timer input D. In fact, during the delay period $T_1$ both the inputs of NOR gate 42 are at logic zero and the output rises to logic one. The timer restarts a new counting when a logic zero timer command input D is formed after the input delay period $T_1$, as described above. As long as the input F is logic 1, the hold signal J remains at a low level, regardless of the state of the enable signal H. The output C of the timer 10 changes to a logic 1 after the counting time period $T_t$ and remains at logic 1 for a time period at least equal to $T_3$, as described above, after which time period the enable signal I changes to a logic 1. The hold signal J remains at a logic zero, due to the presence of the logic 1 command signal F at an input of the gate 43, regardless of the state of the enable signal I. At some later time, the input signal F changes to a logic zero. After the input delay $T_1$, due to the delay capacitor 40 and the charging resistance 41, both of the J and K inputs of NOR gate 42 are at logic zero and cause the gate output D to rise to a logic 1, resetting the counter 20 and, by the process described above, setting the output C of the timer 10 to a logic zero.

The input of an effective actuation signal B during the test cycle resets and restarts the timer as described above, whereby the latter portion A' of the system is effectively actuated, thereby overriding the test cycle and causing the desired intervention, in spite of the presence of a test signal.

There has just been described a novel circuit for testing a logic delay timer which is installed and in service in an equipment logic system without causing the actuation of the timer output load, while allowing effective control intervention and actuation of the timer output load to be made at any time, including the time during which the test is being made.

The present invention has been described in connection with a preferred embodiment thereof, many variations and modifications will now become apparent to those skilled in the art. It is preferred, therefore, that the present invention be limited not by the specific disclosure herein, but only by the appended claims.

What is claimed is:

1. A check circuit for a delay timer which permits the performance of check operations during normal operation of the timer and without taking the timer out of service, said checking operations being for the purpose of determining timer calibration errors, loss in precision and "unsafe" breakdowns of the timer, as well as the check circuit, said check operation being performed without jeopardizing, by uncontrollable breakdowns, the safety of the required interventions performed by the timer, even during a check operation, said timer comprising an input and an output and means for creating a first output state, said input receiving a signal capable of assuming either a first input state or a second input state and normally disabled means for providing a signal of a first output state when said input is at a first input state and for initiating a delay period when said input changes to said second input state and changing the output to a second output state upon completion of said delay period if said input remains at said second input state for a period longer than said delay period, said delay timer controlling an output utilization device having a known reaction time;

said check circuit having first and second inputs and an output;

said first input receiving either one of a check or a control signal;

said check circuit output being coupled to the input of said delay timer; said second input being coupled to the output of said delay timer;

first gate means having two inputs and an output, one of said inputs being coupled to said check circuit first input;

second gate means having two inputs and an output; the output of said second gate means being coupled to said check circuit output;

first delay means coupled between said check circuit first input and one input of said second gate means; the output of said first gate means being coupled to the remaining input of said second gate means;

means connected to the check circuit output and the second input of said check circuit, for providing an enable signal to enable said first gate means whenever said timer input changes to its second state if said timer output is at its first state, and to terminate said enable signal whenever said timer output changes to its second state; and second delay means, coupled between said means for enabling the first gate means and the second input of said first gate means, for delaying the turn-off transition of said enable signal for a predetermined time interval after said timer output has changed to its second state;

said first gate means providing a hold signal when said check circuit first input is at its first state and said logic means generates the enable signal;

said second gate means providing an output signal either after said check circuit first input has changed to its second state or if said first gate means provides said hold signal, providing the second state to said check circuit output and to make said timer count said delay period, even if said check circuit first input changes again to its first state before the end of said counting;

said first delay means providing a first state to the check circuit output by temporarily disabling said first and second gate means, whenever said check circuit first input changes to its second state, so that said timer must reset the counting of said delay period in any case, since another check or control signal is received at said check circuit first input;

said second delay means, when said predetermined time interval is less than the reaction time of the utilization device, giving the capability of providing a signal at said timer output useful for checking the timer without causing operation of the utilization device, when a check signal shorter than the delay period of the timer has been applied to said check circuit first output.

2. The check circuit of claim 1, wherein said first state and said second state for each one of said input and output signals can be obtained according to any convention in which the first and second states are electrically distinguishable from one another.

3. The check circuit of claim 1, wherein said second delay means comprises a first R-C timing circuit.

4. The check circuit of claim 3, wherein said logic means comprises first diode means coupled to said first R-C timing circuit for initiating charging of the timing circuit only when the output of said delay timer is at the second output state.

5. The check circuit of claim 3, wherein said second delay means comprises second diode means coupled to said first R-C timing circuit, whereby said first R-C timing circuit is rapidly discharged to enable initiation of a new testing cycle when said timer input changes to the second input state.

6. The check circuit of claim 3, wherein said first R-C timing circuit introduces a time delay of an interval substantially equal to the time interval of a test pulse applied to the input of said check circuit for enabling a plurality of check circuits and associated delay timers of the type set forth hereinabove to be checked by a single test pulse when connected in cascade fashion.

7. The check circuit of claim 1, wherein said second gate means forms a product of the complement of the input states applied thereto.

8. The check circuit of claim 1, wherein said second gate means forms a complement of the sum of the input states applied to its inputs.

9. The check circuit of claim 1, wherein said check circuit first delay means comprises a second R-C timing circuit.

10. The check circuit of claim 1, wherein the delay timer comprises a normally energized multivibrator means for generating pulses;

a counter driven by pulses from said multivibrator means;

said counter having a reset input and being cleared whenever said check circuit output is at said first input state;

said counter being incremented by the pulses of said multivibrator means until a last stage thereof is enabled, whereby the delay period of said delay timer is a function of the frequency rate of said multivibrator means and the number of stages of said counter;

third gate means responsive to the enablement of said last counter stage to disable said multivibrator means and thereby terminate said pulses;

capacitor means coupled to and alternately charged and discharged by said normally running multivibrator and charged by the multivibrator in the disabled state; and a threshold circuit for generating said second timer output state only when said capacitor means reach a predetermined threshold level.

* * * * *